United States Patent Office 3,422,697
Patented Jan. 21, 1969

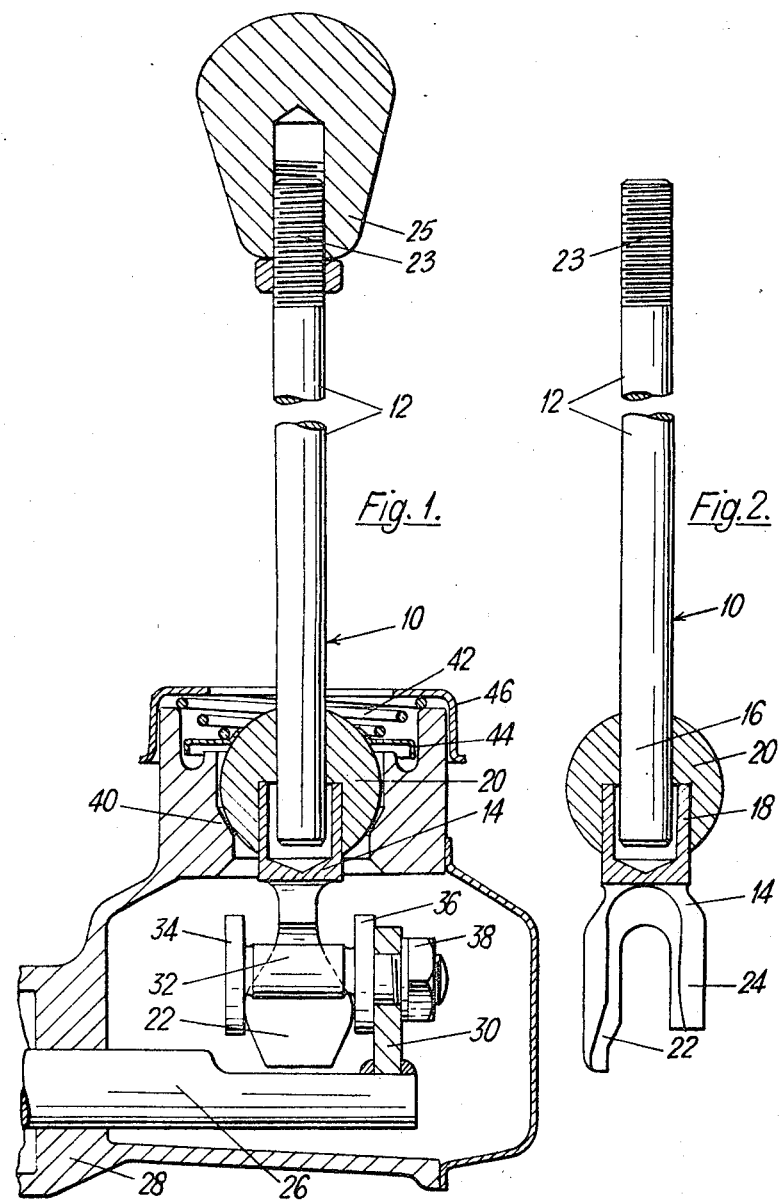

3,422,697
CHANGE-SPEED TRANSMISSION
SELECTOR ASSEMBLIES
Arnold Brown and Peter Norman Taylor, Luton, England, assignors to General Motors Corporation, Detroit, Mich., a corporation of Delaware
Filed Dec. 28, 1966, Ser. No. 605,470
Claims priority, application Great Britain, Jan. 5, 1966, 565/66
U.S. Cl. 74—473     7 Claims
Int. Cl. G05g 9/12

ABSTRACT OF THE DISCLOSURE

For use in change-speed transmission selector assemblies, primarily for effecting gearshifts in motor vehicle change-speed transmissions, a two-part shift lever includes a stem member and an actuator member resiliently interconnected by a body of elastomeric material which surrounds and is secured to external surfaces of both the stem member and a socket portion of the actuator member within which the end portion of the stem member is accommodated with clearance.

Preferably, the body of elastomeric material has a part-spherical external surface: the body of elastomeric material can then be accommodated in a ball socket, and serve as a pivot ball for the shift lever, for example in a gearshift lever for a motor vehicle change-speed transmission. Preferably, also, manual effort applied to the stem member can deform the body of elastomeric material sufficiently to give metal-to-metal contact between the stem member and the socket portion of the actuator member.

BACKGROUND OF THE INVENTION

*Field of the invention.*—Change-speed transmission selector assemblies, for example for effecting gearshifts in motor vehicle change-speed transmissions.

*Description of the prior art.*—German specification 822,045 (Klöckner-Humboldt-Deutz) discloses a two-part gearshift lever, especially for engaging synchronized clutches in the change-speed gearing of heavy motor vehicles, in which the end of one part of the shift lever extends with clearance into a socket portion of the other part of the shift lever. A rubber sleeve contained wholly within the socket portion is interposed between the two parts, such that in a rest position it prevents metal-to-metal contact between the parts, and so reduces undesired oscillation of the gearshift lever arising from the transmission of vibrations up the gearshift lever; when a relative large manual effort is applied to one of the parts of the gearshift lever, however, the rubber sleeve deforms to allow metal-to-metal contact between this part and the rim of the socket portion.

BRIEF SUMMARY OF THE INVENTION

A body of elastomeric material which resiliently interconnects a stem member and an actuator member of a two-part shift lever is secured to the external surfaces of the parts, specifically the external surface of the socket portion of the actuator member and the external surface of the adjacent part of the stem member. With this construction, the size and shape of the body of elastomeric material are not restricted by the need to accommodate the whole of the body in a relatively small annular space between the parts of the shift lever: in particular, the external surface of the body of elastomeric material can be made part-spherical, to allow the resulting part-spherical body to be accommodated in a ball socket and serve as a pivot ball for the shift lever, for example for use as a gearshift lever for a motor vehicle change-speed transmission. Polyurethane plastic is the preferred elastomeric material, since it has a favorable balance of elastic, wear-resistant and frictional characteristics.

BRIEF DESCRIPTION OF THE VIEWS OF THE DRAWING

FIGURE 1 is a longitudinal section, with some parts in elevation, of one embodiment of a shift lever and other parts of a change-speed transmission selector assembly according to the invention; and FIGURE 2 is a rear elevation of the shift lever shown in FIGURE 1.

DESCRIPTION OF THE PREFERRED EMBODIMENT

As shown in the drawing, a shift lever 10 comprises a stem memebr 12 and an actuator member 14. A lower end portion 16 of the stem member is accommodated with both radial and axial clearance in a cup-shaped socket portion 18 of the actuator member. The stem member and the socket member are resiliently interconnected by a body of elastomeric material 20 composed of polyurethane plastic, which has a stepped through aperture the walls of which are firmly secured by adhesive bonding to the external surface of the socket portion of the actuator member and to the external surface of the adjacent part of the stem member.

The body of elastomeric material has a part-spherical external surface, and can thereby serve as a pivot ball for the shift lever. The body of elastomeric material resiliently interconnects the actuator member and the stem member of the shift lever, with the clearance between these members preventing metal-to-metal contact, for reducing the transmission of vibrations up the shift lever.

The stem member 12 has an upper end portion 23 that is threaded for the reception of a shift lever knob 25, and a locking nut for the knob. The clearance between the stem member and the actuator member, and the resilience of the body of elastomeric material, are such that on the application of manual effort to the stem member, via the shift lever knob, the lower end portion 16 of the stem member engages the surrounding cylindrical wall of the socket portion 18, with deformation of the body of elastomeric material.

The lower end of the actuator member 14 is slotted to form a pair of unequal length legs 22 and 24 depending from the socket portion 18, the leg 22 being the longer leg of the pair. FIGURE 1 indicates how these legs can be used to transmit movements of the shift lever 10 to a selector rod 26 that is mounted for rotary and axial movement in a remote control housing 28.

In detail, as shown in FIGURE 1, the end portion of the selector rod 26 is formed with a flat surface to which is welded a radially projecting crank arm 30. A crank pin 32 having spaced flanges 34 and 36 is mounted eccentrically in an aperture in the crank arm, and is restrained from rotation by a lock nut 38 provided with a washer. The legs 22 and 24 of the shift lever 10 straddle the crank pin, and include convexly curved surfaces for contacting the inner surfaces of the flanges 34 and 36, for giving a low-friction pivotal connection.

An upper portion of the housing 28 is formed as a ball socket 40 for the spherically-surfaced body of polyurethane plastic, which as already indicated forms a pivot ball for the shift lever. The ball is resiliently held on its seat by means of a conical spring 42 which is held in light compression between an annular sheet metal lower seat 44 that engages the pivot ball, and an annular sheet metal upper seat 46 that forms a cap for the upper portion of the housing 28. A conventional convoluted resilient boot (not shown) is sealingly connected between the upper portion of the housing 28 and the stem member 12 of the shift lever, to exclude dirt.

The end of the selector rod 26 remote from the housing 28 is connected, in a conventional manner which need not be further described or shown, to control striker members of a stepped-ratio gearbox, such that rotary movement of the selector rod causes selection of one of the striker members, and subsequent axial movement of the selector rod causes sliding or pivotal movement of the selected striker member to engage or disengage an associated coupling member in the gearbox. The rotary and axial movements of the selector rod are obtained by appropriate movements of the shift lever knob 25, namely movement in an axial plane at right angles to the plane of the paper in FIGURE 1, and movement in the plane of the paper, respectively.

Movement of the shift lever knob 25 in the direction forwardly out of the plane of the paper in FIGURE 1 is normally limited by engagement of the longer leg 22 with the selector rod 26. However, if the knob is lifted against the force of the spring 42, it can assume a position in which the selector rod is clear of the path of movement of the longer leg. The engagement of the longer leg with the selector rod can be utilised to prevent inadvertent movement of the shift lever into a reverse position.

This use of the body of elastomeric material 20 as a pivot ball for the shift lever, in addition to preventing metal-to-metal contact between the stem member and the actuator member of the shift lever in the rest position of the shift lever, also prevents metal-to-metal contact between the shift lever and the ball socket. In a construction in which a pivot ball for the shift lever is arranged to be lifted from its seat to engage reverse, the maximum spring load which can be used to hold the ball on its seat is about 12 lbs., which is not sufficient to prevent rattle with a conventional metal ball. However, by utilising the body of elastomeric material as a pivot ball, as described, metal-to-metal contact in the periods between shifts is virtually eliminated, so reducing the likelihood of rattle. Nevertheless, a positive action during shifts is possible because the elastomeric material can yield in response to manual effort to allow the stem member of the shift lever to engage the actuator member.

We claim:

1. A change-speed transmission selector assembly comprising a shift lever having an actuator member and a separate stem member, one of said members having a socket portion on one end thereof, the other of said members having an extending end portion which projects into said socket portion, elastomeric connector means external of said socket portion and said extending end portion to resiliently hold said extending end portion in spaced relationship with respect to said socket portion and to resiliently interconnect said members to each other, and support means providing a seat for said elastomeric connector means.

2. A change-speed transmission selector assembly according to claim 1, wherein said elastomeric means is formed from polyurethane plastic.

3. A change-speed transmission selector assembly according to claim 1, wherein said support means has a ball socket and wherein said elastomeric connector means has a part-spherical external surface which is accommodated in said ball socket to serve as a pivot ball for said shift lever.

4. A change-speed transmission selector assembly according to claim 3, and further comprising a compression spring for biasing said elastomeric connector means into said ball socket.

5. A change-speed transmission selector assembly according to claim 4, and further comprising stop means for limiting the movement of said shift lever, said actuator member having an abutment engagement with said stop means on predetermined pivotal movement in one directio of said shift lever with respect to said ball socket, and said ball socket being shaped to allow said connector to be lifted from a seated position in said ball socket to a position in which said abutment on said actuator member is clear of said stop means to permit further pivotal movement of said shift lever in said one direction past said stop means.

6. The change-speed transmission selector assembly according to claim 5, said actuator member having a stirrup joint with a long leg and a short leg, said stop means being a transmission-control selector rod, and said abutment being formed by said long leg of said stirrup joint.

7. A change-speed transmission selector assembly comprising a shift lever having an actuator member and a separate stem member, one of said members having a metallic socket portion with internal walls on one end thereof, the other of said members having a metallic extending end portion which projects into said socket portion, elastomeric connector means secured to external portions of said socket portion and said extending end portion to resiliently interconnect said members to each other for spacing said end portion from said internal walls of said socket portion and for allowing said extending end portion to be brought into metal-to-metal contact with the sides of said socket portion in response to a predetermined force applied to said actuator member, and support means providing a pivotal seat for said elastomeric connector means.

References Cited

UNITED STATES PATENTS

| | | | |
|---|---|---|---|
| 1,927,646 | 9/1933 | Miller | 74—473 |
| 2,939,332 | 6/1960 | Peterson | 74—471 |
| 3,269,208 | 8/1966 | Whitchurch | 74—473 |

HALL C. COE, *Primary Examiner.*